United States Patent
Ge et al.

(10) Patent No.: US 8,576,696 B2
(45) Date of Patent: Nov. 5, 2013

(54) MOBILE MULTIMEDIA BROADCAST TRANSMISSION SYSTEM

(75) Inventors: Qihong Ge, Beijing (CN); Dong Bai, Beijing (CN); Tao Tao, Beijing (CN); Qiusheng Wang, Beijing (CN); Wen Chen, Beijing (CN)

(73) Assignee: Timi Technologies Co., Ltd., Beijing (CN)

( * ) Notice: Subject to any disclaimer, the term of this patent is extended or adjusted under 35 U.S.C. 154(b) by 299 days.

(21) Appl. No.: 13/148,242

(22) PCT Filed: Feb. 1, 2010

(86) PCT No.: PCT/CN2010/070454
§ 371 (c)(1),
(2), (4) Date: Aug. 5, 2011

(87) PCT Pub. No.: WO2010/091617
PCT Pub. Date: Aug. 19, 2010

(65) Prior Publication Data
US 2011/0299381 A1 Dec. 8, 2011

(30) Foreign Application Priority Data
Feb. 11, 2009 (CN) .............................. 200910078051

(51) Int. Cl.
*H04J 11/00* (2006.01)
(52) U.S. Cl.
USPC ........................................................ 370/210
(58) Field of Classification Search
USPC ........................................................ 370/210
See application file for complete search history.

(56) References Cited

U.S. PATENT DOCUMENTS

| 2003/0031120 | A1* | 2/2003 | Miyato et al. | 370/203 |
| 2004/0228272 | A1* | 11/2004 | Hasegawa et al. | 370/210 |
| 2006/0164973 | A1* | 7/2006 | Lee et al. | 370/208 |
| 2010/0098193 | A1* | 4/2010 | Liu et al. | 375/340 |

* cited by examiner

*Primary Examiner* — Jae Y Lee
*Assistant Examiner* — Jean F Voltaire
(74) *Attorney, Agent, or Firm* — Troutman Sanders LLP

(57) ABSTRACT

A mobile multimedia broadcast transmission system is provided, which comprises: a Reed-Solomon (RS) coding and byte interleaving unit, a Low Density Parity Check (LDPC) coder, a bit interleaver, a constellation mapping unit, a frequency domain symbol generator, a scrambler, an Inverse Fast Fourier Transform (IFFT) unit, a time domain framing unit, and a transmitter. According to the technical solutions provided in the present invention, the system can provide high-quality mobile multimedia services for users in a 6 MHz operation bandwidth. Furthermore, an optimized selection is performed on RS coding according to the operation bandwidth of the system, thereby selecting an appropriate coding mode according to different channel conditions. Accordingly, the byte interleaver is optimized, such that suitable interleaving parameters can be used to perform byte interleaving. With the technical solutions provided in the present invention, the continuous pilots, the discrete pilots and the digital sub-carriers of the system can be suitably configured and allocated according to the actual bandwidth of the system, thereby suitably configuring the system overhead of the mobile multimedia broadcast transmission system to efficiently utilize spectral resources for data transmission.

17 Claims, 6 Drawing Sheets

MOBILE MULTIMEDIA BROADCAST TRANSMISSION SYSTEM

BENEFIT CLAIMS

This application is a US National Stage of International Application No. PCT/CN2010/070454, filed Feb. 1, 2010, which claims the benefit of CN 200910078051.5, filed Feb. 11, 2009.

FIELD OF THE INVENTION

The invention relates to the field of digital information transmission technology, and more particularly, to a mobile multimedia broadcast transmission system.

BACKGROUND OF THE INVENTION

Currently, for both wired and wireless communication services, multimedia services have become the major services which operators provide to their to subscribers. In the field of wireless communication, wireless broadcast communication is characterized by larger coverage and high program capacity. The greatest advantage of the wireless broadcast communication consists in its nature of broadcast and capability of point-to-multipoint, such that a high transmission bandwidth can be achieved with a low cost. Thus, the wireless communication broadcast, as an important part of the information/communication industry, plays a critical role in construction of the national information infrastructure and implementation of ubiquitous service as well as in the national information security strategy.

Among a variety of multimedia services, mobile multimedia broadcast service is now regarded by the industry as an important application with a prospect of promotion. Here, the mobile multimedia broadcast service refers to a system enabling small sized, mobile and portable handheld terminals with a screen smaller than 7", such as mobile phone, PDA, MP3, MP4, digital camera, notebook computer and any other receiving devices, to receive services such as broadcast TV programs and information services anytime and anywhere.

At present, some of such service are provided by the mobile multimedia broadcast based on existing mobile communication networks and streaming media. However, due to the technical limitations (such as bandwidth) of the existing mobile communication networks, the above communication approach cannot further improve the performance of the existing mobile multimedia performance and thus cannot provide satisfactory audience experience to the subscribers. Since the broadcast technology and the broadcast network have their own advantages, such as unlimited receptions once transmitted, low cost and high bandwidth, it is a principle of research and development for mobile multimedia broadcast to provide a high-quality broadcast multimedia service to handheld terminals by cooperation of broadcast networks and communication networks.

The applicant has proposed a system network architecture with a satellite broadcast coverage as a primary part and a terrestrial supplementation network as a secondary part, especially for the scenario in China which has a vast territory, a complicated transmission environment, cities located intensively in the east and sparsely in the west, a huge amount of users and a diversity of service demands. According to this architecture, the characteristics of satellites, such as large coverage, short construction period and high efficiency, are fully utilized to achieve a solution for implementing a country-wise coverage of mobile multimedia broadcast signals cost-effectively and rapidly. Invention patent applications have been filed based on the above technical solutions; cf. Chinese Patent Applications No. 200610113915.9 and No. 200610113916.3. In the disclosures of the above applications, specific technical solutions are provided for mobile multimedia broadcast, including physical layer channel frame structure, channel coding and modulation for the mobile multimedia broadcast.

However, the technical solutions in the above applications generally relate to the mobile multimedia broadcast communication with in a bandwidth of 8 MHz or 2 MHz. With the rapid growth of the global wireless communication business, the contradiction between the supply and the demand for radio frequency resources is increasingly deteriorated. As a special resource essential to wireless communication, the frequency resources are exclusive and multiplexed. That is, within particular time, geographical area and frequency band, the frequency resources, once used, cannot be used by other devices. However, the radio frequencies can be multiplexed and shared given particular time, geographical area and coding condition. There is thus a need for a communication system suitable for different operation bandwidths to allow for different frequency resource assignment situations in individual countries in the world.

SUMMARY OF THE INVENTION

An object of the present invention is to solve at least one of the above problems in the prior art, especially the problem regarding the transmission of mobile multimedia broadcast within different operation bandwidths. Further aspects and advantages of the present invention will be given in the following description. They will become apparent from either the following description or the implementation of the present invention.

In order to achieve the above object, a mobile multimedia broadcast transmission system is provided, which comprises:
- a Reed-Solomon (RS) coding and byte interleaving unit for RS coding and byte interleaving an upper layer data stream through a physical logical channel;
- a Low Density Parity Check (LDPC) coder for LDPC coding the data output from the RS coding and byte interleaving unit to obtain bit data;
- a bit interleaver adapted for bit interleaving the bit data output from the LDPC coder;
- a constellation mapping unit for constellation mapping the data output from the bit interleaver;
- a frequency domain symbol generator for multiplexing discrete pilots, continuous pilots containing system information and constellation mapped data symbols into OFDM frequency domain symbols;
- a scrambler for scrambling the OFDM frequency domain symbols with a pseudo-random sequence;
- an Inverse Fast Fourier Transform (IFFT) unit for IFFT transforming the frequency domain symbols output from the scrambler to generate OFDM time domain symbols;
- a time domain framing unit for forming the OFDM time domain symbols into time slots and concatenating the time slots into a physical layer signal frame; and
- a transmitter for converting the physical layer signal frame from baseband to radio frequency for transmission, wherein the transmitter is configured for signal transmission over any 6 MHz bandwidth in a wireless channel.

According to an embodiment of the present invention, the physical layer signal frame has a duration of one second and includes 40 time slots each having a duration of 25 ms, each time slot including one beacon and 53 OFDM symbols, the beacon including one transmitter identification signal and two identical sync signals, the transmitter identification signal being obtained by BPSK mapping, IFFT transforming and periodically spreading a frequency domain random sequence, each of the sync signals being obtained by BPSK mapping and IFFT transforming a truncated frequency domain random sequence.

According to an embodiment of the present invention, the transmitter identification signal is identified by 141-bit information, carried by the sub-carrie number $N_{ID}$=256 of the transmitter identification signal and modulated with BPSK, the transmitter identification signal $X_{ID}(i)$ being generated by mapping a transmitter identification sequence TxID(k) according to:

$$X_{ID}(i) = \begin{cases} 1 - 2 \times TxID(i-1), & 1 \le i \le 70 \\ 0, & i = 0 \text{ or } 71 \le i \le 184 \\ 1 - 2 \times TxID(i-115), & 185 \le i \le 255. \end{cases}$$

According to an embodiment of the present invention, the sync signal $S_b(t)$ is a band-limited pseudo-random signal having a duration $T_b$ of 204.8 μs:

$$S_b(t) = \frac{1}{\sqrt{N_b}} \sum_{i=0}^{N_b-1} X_b(i) e^{j2\pi i (\Delta f)_b t}, \quad 0 \le t \le T_b,$$

where $N_b$ is the number of sub-carriers for carrying the sync signal, $X_b(i)$ is a BPSK modulated signal carrying a binary pseudo-random sequence $PN_b(k)$, and $(\Delta f)_b$ is the sub-carrier interval for the sync signal; wherein $N_b$=2048, and the BPSK modulated signal $X_b(i)$ for $PN_b(k)$ is generated by mapping $PN_b(k)$ according to:

$$X_b(i) = \begin{cases} 1 - 2 \times PN_b(i-1), & 1 \le i \le 568 \\ 0, & i = 0 \text{ or } 59 \le i \le 1479 \\ 1 - 2 \times PN_b(i-912), & 1480 \le i \le 2047. \end{cases}$$

According to an embodiment of the present invention, the binary pseudo-random sequence is generated by a linear feedback shift register having an initial value of 01110101101 and a generation polynomial of $x^{11}+x^9+1$.

According to an embodiment of the present invention, the transmitter identification, the sync sequence and the OFDM symbols overlap with each other with a guard interval having a window function, the window function having an expression of:

$$w(t) = \begin{cases} 0.5 + 0.5\cos(\pi + \pi t/T_{GD}), & 0 \le t \le T_{GD} \\ 1, & T_{GD} < t < T + T_{GD} \\ 0.5 + 0.5\cos(\pi + \pi (T-t)/T_{GD}), & T + T_{GD} \le t \le T + 2T_{GD}, \end{cases}$$

where t is a temporal variable, T is a constant and $T_{GD}$ is the duration of the guard interval.

According to an embodiment of the present invention, the RS coding is based on a truncated code of RS(192, K) obtained by truncating an original system code of RS(255, M), where M=K+63, K is the number of bytes of information sequence in one codeword, each code element of the system code of RS (255, M) being taken from the domain GF(256) having a generation polynomial of $p(x)=x^8+x^4+x^3+x^2+1$.

According to an embodiment of the present invention, the RS(192, K) code comprises four modes having the K value of 192, 168, 160 and 144, respectively.

According to an embodiment of the present invention, the expression of the generation polynomial for the RS(192, K) code is $$g(x) = \sum_{i=0}^{192-K} g_i x^i,$$

and wherein for K=192, the coefficient $g_i$ in the expression of the generation polynomial for RS(192, 192) is

| i | $g_i$ |
|---|---|
| 0 | 1 | for K=168, the coefficient $g_i$ in the expression of the generation polynomial for RS(192, 168) is

| i | $g_i$ |
|---|---|
| 0 | 193 |
| 1 | 108 |
| 2 | 199 |
| 3 | 208 |
| 4 | 173 |
| 5 | 79 |
| 6 | 45 |
| 7 | 133 |
| 8 | 251 |
| 9 | 125 |
| 10 | 44 |
| 11 | 167 |
| 12 | 198 |
| 13 | 150 |
| 14 | 174 |
| 15 | 252 |
| 16 | 218 |
| 17 | 8 |
| 18 | 197 |
| 19 | 195 |
| 20 | 20 |
| 21 | 33 |
| 22 | 197 |
| 23 | 244 |
| 24 | 1 | for k=160, the coefficient $g_i$ in the expression of the generation polynomial for RS(192, 160) is

| i | $g_i$ |
|---|---|
| 0 | 45 |
| 1 | 216 |
| 2 | 239 |
| 3 | 24 |
| 4 | 253 |
| 5 | 104 |
| 6 | 27 |
| 7 | 40 |

-continued

| i | $g_i$ |
|---|---|
| 8 | 107 |
| 9 | 50 |
| 10 | 163 |
| 11 | 210 |
| 12 | 227 |
| 13 | 134 |
| 14 | 224 |
| 15 | 158 |
| 16 | 119 |
| 17 | 13 |
| 18 | 158 |
| 19 | 1 |
| 20 | 238 |
| 21 | 164 |
| 22 | 82 |
| 23 | 43 |
| 24 | 15 |
| 25 | 232 |
| 26 | 246 |
| 27 | 142 |
| 28 | 50 |
| 29 | 189 |
| 30 | 29 |
| 31 | 232 |
| 32 | 1 | for k=144, the coefficient $g_i$ in the expression of the generation polynomial for RS(192, 144) is

| i | $g_i$ |
|---|---|
| 0 | 228 |
| 1 | 231 |
| 2 | 214 |
| 3 | 81 |
| 4 | 113 |
| 5 | 204 |
| 6 | 19 |
| 7 | 169 |
| 8 | 10 |
| 9 | 244 |
| 10 | 117 |
| 11 | 219 |
| 12 | 130 |
| 13 | 12 |
| 14 | 160 |
| 15 | 151 |
| 16 | 195 |
| 17 | 170 |
| 18 | 150 |
| 19 | 151 |
| 20 | 251 |
| 21 | 218 |
| 22 | 245 |
| 23 | 166 |
| 24 | 149 |
| 25 | 183 |
| 26 | 109 |
| 27 | 176 |
| 28 | 148 |
| 29 | 218 |
| 30 | 21 |
| 31 | 161 |
| 32 | 240 |
| 33 | 25 |
| 34 | 15 |
| 35 | 71 |
| 36 | 62 |
| 37 | 5 |
| 38 | 17 |
| 39 | 32 |
| 40 | 157 |
| 41 | 194 |
| 42 | 73 |
| 43 | 195 |
| 44 | 218 |
| 45 | 14 |
| 46 | 12 |
| 47 | 122 |
| 48 | 1 |

According to an embodiment of the present invention, the upper layer data stream is input to the RS coding and byte interleaving unit in a column-wise manner from left to right in units of bytes, and wherein the RS coding is carried out in a row-wise manner and the start byte of the byte interleaving unit is mapped onto the start point of a particular time slot for transmission.

According to an embodiment of the present invention, the block output from the LDPC coder has a length of 9216 bits and code rates of 1/2 and 3/4, respectively, and wherein the interleaving modes of the byte interleaving unit corresponding to the code rates are:

|  | 1/2 LDPC Code | 3/4 LDPC Code |
|---|---|---|
| Interleaving Mode 1 | MI = 66 | MI = 99 |
| Interleaving Mode 2 | MI = 132 | MI = 198 |
| Interleaving Mode 3 | MI = 264 | MI = 396 | where MI is the number of rows for the byte interleaving unit which having MI×192 bytes in total.

According to an embodiment of the present invention, the bit interleaver is configured as a 384×264 block interleaver, the bit data output from the LDPC coder is sequentially written into each row of the block interleaver in a top-down order until the entire block interleaver is fully filled and then sequentially read out in a column-wise manner from left to right, and wherein the output from the bit interleaver is aligned with the time slots.

According to an embodiment of the present invention, the frequency domain symbol generator is configured to multiplex, in each OFDM symbol, 284 discrete pilots, 78 continuous pilots and 1914 data sub-carriers into 2276 effective sub-carriers.

According to an embodiment of the present invention, the 78 continuous pilots use the sub-carriers numbered 0, 2, 40, 92, 124, 138, 178, 200, 206, 234, 280, 292, 342, 384, 390, 410, 472, 496, 502, 526, 564, 616, 638, 662, 706, 742, 762, 768, 814, 842, 866, 884, 942, 974, 1004, 1020, 1052, 1134, 1137, 1138, 1140, 1222, 1254, 1270, 1300, 1368, 1390, 1408, 1432, 1460, 1506, 1512, 1532, 1568, 1612, 1636, 1658, 1710, 1748, 1772, 1778, 1802, 1864, 1884, 1890, 1932, 1982, 1994, 2040, 2068, 2074, 2096, 2136, 2150, 2182, 2234, 2272, 2275 from the 2276 effective sub-carriers, of which 64 sub-carriers each numbered 2, 496, 1368, 1802, 40, 502, 1390, 1864, 92, 526, 1408, 1884, 124, 564, 1432, 1890, 138, 616, 1460, 1932, 178, 638, 1506, 1982, 200, 662, 1512, 1994, 206, 706, 1532, 2040, 234, 742, 1568, 2068, 280, 762, 1612, 2074, 292, 768, 1636, 2096, 342, 814, 1658, 2136, 384, 842, 1710, 2150, 390, 866, 1748, 2182, 410, 884, 1772, 2234, 472, 942, 1778, 2272 are used for carrying 16-bit system information; wherein the system information contains a 6-bit time slot number, a 1-bit byte interleaving unit sync identification, a 1-bit control logical channel alternation indication and a 8-bit reserved word;

wherein the continuous pilots are mapped onto the sub-carriers according to:

$$0 \to \sqrt{2}/2 + \sqrt{2}/2j \text{ and } 1 \to -\sqrt{2}/2 - \sqrt{2}/2j$$

and wherein, in a single time slot, the symbols transmitted at same continuous sub-carrier point of different OFDM symbols are identical to each other.

According to an embodiment of the present invention, for an OFDM symbol numbered n in each time slot, the sub-carriers corresponding to the discrete pilots in the OFDM symbol are numbered as m, where if $\mod(n, 2) = 0$
$$m = \begin{cases} 8p+1, & p = 0, 1, 2, \ldots, 141 \\ 8p+3, & p = 142, 143, 144, \ldots, 283 \end{cases}$$

if $\mod(n, 2) = 1$
$$m = \begin{cases} 8p+5, & p = 0, 1, 2, \ldots, 141 \\ 8p+7, & p = 142, 143, 144, \ldots, 283, \end{cases}$$

and the values of the discrete pilots are all 1+0j.

According to an embodiment of the present invention, the generation polynomial for the pseudo-random sequence used by the scrambler is $x^{12}+x^{11}+x^8+x^6+1$, and the scramble code has eight patterns corresponding to the following initial values of the register, respectively:

1) Scramble Code Pattern 0—Initial value 0000 0000 0001,
2) Scramble Code Pattern 1—Initial value 0000 1001 0011,
3) Scramble Code Pattern 2—Initial value 0000 0100 1100,
4) Scramble Code Pattern 3—Initial value 0010 1011 0011,
5) Scramble Code Pattern 4—Initial value 0111 0100 0100,
6) Scramble Code Pattern 5—Initial value 0100 0100 1100,
7) Scramble Code Pattern 6—Initial value 0001 0110 1101,
8) Scramble Code Pattern 7—Initial value 1010 1011 0011;

and wherein the pseudo-random sequence is reset at the start of each time slot such that all of the time slots are scrambled with the same pattern.

According to an embodiment of the present invention, the IFFT (Inverse Fast Fourier Transform) unit is configured to place the 2276 effective sub-carriers in sub-carriers 1-1138 and 2958-4095 of 4096 sub-carriers for a 4096-point IFFT operation.

According to an embodiment of the present invention, the time domain framing unit is configured to add a guard interval, a sync signal and a transmitter identification signal sequentially to a modulated OFDM symbol to form a time slot and to concatenate 40 time slots into a physical layer signal frame.

According to the present invention, in order to enable the mobile multimedia broadcast transmission system to function properly in various frequency bandwidths, especially to provide high-quality mobile multimedia services for users in a 6 MHz operation bandwidth, the transmitter identification signal and the sync signal are appropriately configured based on technical characteristics of the system, such that stable system information can be provided for the system. Furthermore, an optimized selection is performed on RS coding according to the operation bandwidth of the system, thereby selecting an appropriate coding mode according to different channel conditions. Accordingly, the byte interleaver is optimized, such that suitable interleaving parameters can be used to perform byte interleaving. With the technical solutions provided in the present invention, the continuous pilots, the discrete pilots and the digital sub-carriers of the system can be suitably configured and allocated according to the actual bandwidth of the system, thereby suitably configuring the system overhead of the mobile multimedia broadcast transmission system to efficiently utilize spectral resources for data transmission.

BRIEF DESCRIPTION OF THE DRAWINGS

The above and/or further aspects and advantages will be apparent and easy to understand from the following description of embodiments with reference to the figures, in which.

DETAILED DESCRIPTION OF PREFERRED EMBODIMENTS

Figure 1:
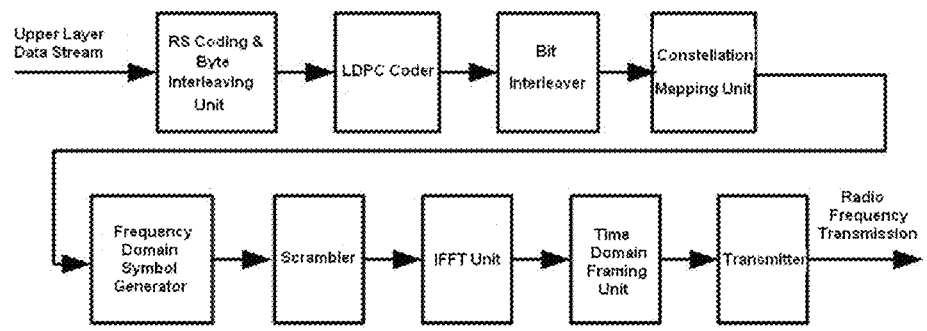
FIG. 1 is a schematic diagram showing the structure of the mobile multimedia broadcast transmission system according the present invention.

Embodiments of the present invention will be detailed in the following. The exemplary embodiments are illustrated in the figures, throughout which same or similar reference numerals refer to same or similar elements or to elements having same or similar functions. The following embodiments described with reference to the figures are exemplary only for explaining, rather than limiting, the present invention.

As shown in FIG. 1, a mobile multimedia broadcast transmission system according to the present invention comprises:

a Reed-Solomon (RS) coding and byte interleaving unit, a Low Density Parity Check (LDPC) coder, a bit interleaver, a constellation mapping unit, a frequency domain symbol generator, a scrambler, an Inverse Fast Fourier Transform (IFFT) unit, a time domain framing unit, and a transmitter.

Herein, the RS coding and byte interleaving unit is adapted for RS coding and byte interleaving an upper layer data stream through a physical logical channel. The LDPC coder is adapted for LDPC coding the data output from the RS coding and byte interleaving unit to obtain bit data. The bit interleaver is adapted for bit interleaving the bit data output from the LDPC coder. The constellation mapping unit is adapted for constellation mapping the data output from the bit interleaver. The frequency domain symbol generator is adapted for multiplexing discrete pilots, continuous pilots containing system information and constellation mapped data symbols together to forming OFDM frequency domain symbols. The scrambler is adapted for scrambling the OFDM frequency domain symbols with a pseudo-random sequence. The IFFT unit is adapted for IFFT transforming the frequency domain symbols output from the scrambler to generate OFDM time domain symbols. The time domain framing unit is adapted for forming the OFDM time domain symbols into time slots and concatenating the time slots into a physical layer signal frame. The transmitter is adapted for converting the physical layer signal frame from baseband to radio frequency for transmission, wherein the transmitter is configured for signal transmission over any 6 MHz bandwidth in a wireless channel.

With the mobile multimedia broadcast transmission system according to the present invention, it is possible to provide subscribers with multimedia programs including high-quality digital audio broadcast and digital video broadcast.

According to the present invention, various physical layer functional modules are defined, which are capable of adapting the upper layer data stream broadcasted by the mobile multimedia broadcast transmission system in each 6 MHz frequency band, thereby giving the frame structure, channel coding and modulation technique for physical layer transmission signal of the mobile multimedia broadcast channel.

According to the present invention, the physical layer of the broadcast channel is defined for adapting various upper layer applications to various demands on transmission rate by means of physical logical channel. The physical logical channel can support a number of coding and modulation schemes, so as to achieve different channel qualities required for different applications and different transmission environments.

According to the present invention, the physical layer of the broadcast channel is defined for supporting two networking modes, Single Frequency Network (SFN) and Multiple Frequency Network (MFN), such that different transmission modes and parameters can be selected based on characteristics of actual applications and networking conditions. In this way, a hybrid mode of a number of applications can be supported to achieve the matching between the application characteristics and the transmission modes, so as to realize the flexibility and the cost-effectiveness of the applications.

Figure 2:
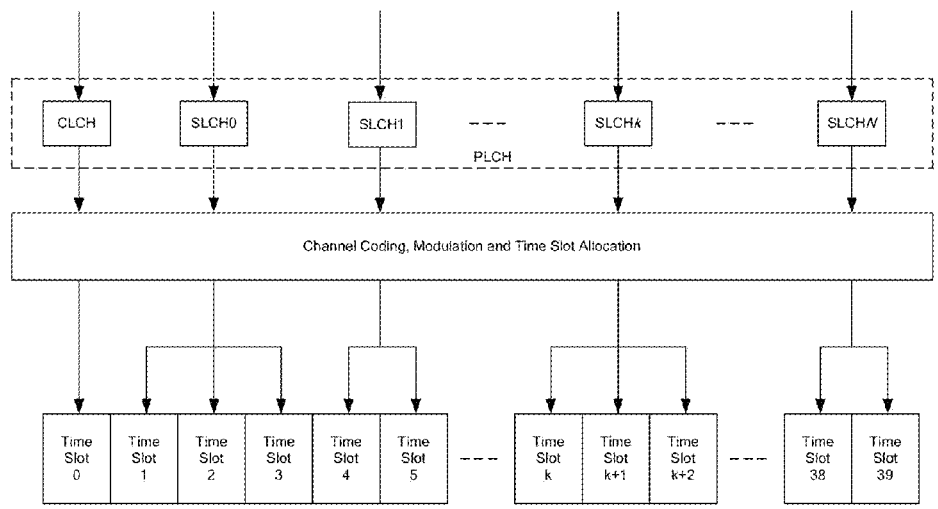
FIG. 2 is a schematic diagram showing the structure of the physical logical channel for the broadcast channel of the mobile multimedia broadcast transmission system according the present invention.

FIG. 2 is a schematic diagram showing the structure of the physical logical channel for the broadcast channel of the mobile multimedia broadcast transmission system according the present invention.

At the physical layer, the broadcast channel for an upper layer application is provided by a Physical Logical CHannel (PLCH) including a Control Logical CHannel (CLCH) and a Service Logical CHannel (SLCH). Each PLCH can use one or more time slots in a 6 MHz digital TV bandwidth for transmission. At the physical layer, each of the PLCHs is separately coded and modulated. Depending on different coding and modulation parameters, a PLCH can provide different transmission capacities.

Figure 3:
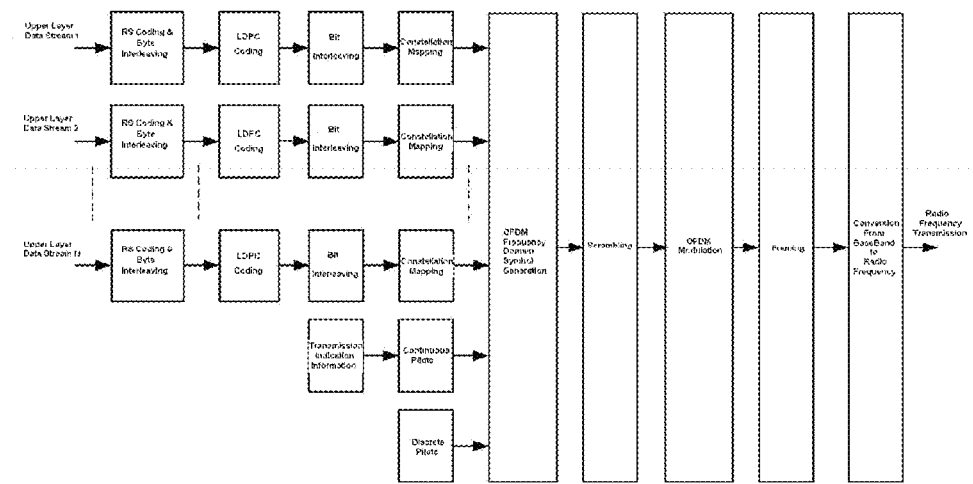
FIG. 3 is a flowchart illustrating the logical channel coding and modulation for the physical layer of the mobile multimedia broadcast transmission system according the present invention.

FIG. 3 is a flowchart illustrating the logical channel coding and modulation for the physical layer of the mobile multimedia broadcast transmission system according the present invention.

As shown, after subjected to feedforward error correction coding, interleaving and constellation mapping, an input data stream in a PLCH can be multiplexed with discrete pilots and continuous pilots for OFDM modulation. A frame header is added to the modulated signal to form a physical layer signal frame, which is then converted from baseband to radio frequency for transmission.

The PLCH can be divided into the CLCH and the SLCH. The CLCH is configured for carrying system configuration information and is transmitted at the time slot 0 of the system with a fixed channel and modulation mode.

Figure 4:
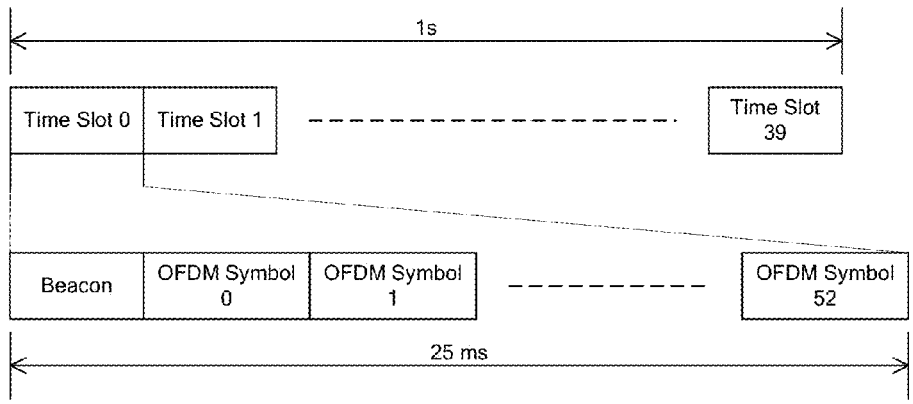
FIG. 4 is a schematic diagram showing the time slot division and the frame structure for the physical layer signal frame obtained by means of time domain framing.

FIG. 4 is a schematic diagram showing the time slot division and the frame structure for the physical layer signal frame obtained by means of time domain framing.

As shown, each frame of the physical layer signal of the system has a duration of 1 second and is divided into 40 time slots (TSs) each having a duration of 25 ms. Each time slot contains one beacon and 53 OFDM modulated data blocks.

Figure 5:
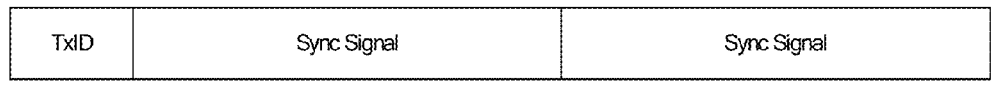
FIG. 5 is a schematic diagram showing the structure of a beacon.

FIG. 5 is a schematic diagram showing the structure of a beacon. As shown, the beacon includes two identical sync signals and a transmitter identification signal (ID).

The sync signal is a band-limited pseudo-random signal having a duration $T_b$ of 204.8 μs. The sync signal is generated according to the following formula:

$$S_b(t) = \frac{1}{\sqrt{N_b}} \sum_{i=0}^{N_b-1} X_b(i) e^{j2\pi i (\Delta f)_b t}, \quad 0 \le t \le T_b,$$

where $N_b$ is the number of sub-carriers for the sync signal, $X_b(i)$ is a BPSK modulated signal carrying a binary pseudo-random sequence $PN_b(k)$, and $(\Delta f)_b$ is the sub-carrier interval for the sync signal. The value of $(\Delta f)_b$ can be 4.8828125 kHz and the number of sub-carriers for the sync signal $N_b$=2048.

Herein, the BPSK modulated signal $X_b(i)$ for carrying a binary pseudo-random sequence $PN_b(k)$ is generated by mapping $PN_b(k)$ according to:

$$X_b(i) = \begin{cases} 1 - 2PN_b(i-1), & 1 \le i \le 568 \\ 0, & i = 0 \text{ or } 569 \le i \le 1479 \\ 1 - 2 \times PN_b(i-912), & 1480 \le i \le 2047. \end{cases}$$

Figure 6:
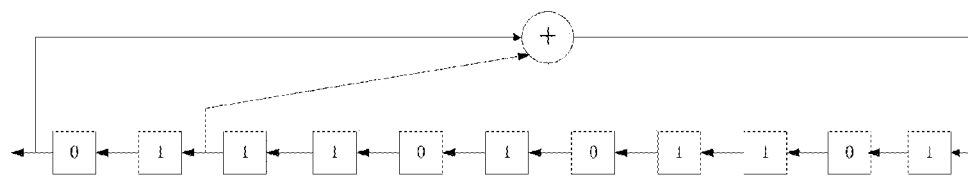
FIG. 6 is a schematic diagram showing the structure of the pseudo-random sequence generator for the sync signal.

The binary pseudo-random sequence $PN_b(k)$ is generated by a linear feedback shift register having a generation polynomial of $x^{11}+x^9+1$, as shown in FIG. 6. The shift register has an initial value of 01110101101, which is the same for each sync signal.

The transmitter identification signal $S_{ID}(t)$ is a band-limited pseudo-random for identifying different transmitters. The signal $S_{ID}(t)$ has a duration $T_{ID}$ of 36.0 μs. The transmitter identification signal is:

$$S_{ID}(t) = \frac{1}{\sqrt{N_{ID}}} \sum_{i=0}^{N_{ID}-1} X_{ID}(i) e^{j2\pi i(\Delta f)_{ID}(t-T_{IDCP})}, \quad 0 \le t \le T_{ID},$$

where $N_{ID}$ is the number of sub-carriers for the transmitter identification signal, $X_{ID}(i)$ is a BPSK modulated signal carrying a transmitter identification sequence, $(\Delta f)_{ID}$ is the sub-carrier interval for the transmitter identification signal having a value of 39.0625 kHz, and $T_{IDCP}$ is a duration of the cyclic prefix of the transmitter identification signal having a value of 10.4 µs. Herein, the number of sub-carriers for the transmitter identification signal $N_{ID}$=256.

The BPSK modulated signal $X_{ID}(i)$ carrying a transmitter identification sequence is generated by mapping a transmitter identification sequence TxID(k) according to:

$$X_{ID}(i) = \begin{cases} 1 - 2 \times TxID(i-1), & 1 \le i \le 70 \\ 0, & i = 0 \text{ or } 71 \le i \le 184 \\ 1 - 2 \times TxID(i-115), & 185 \le i \le 255. \end{cases}$$

The above transmitter identification sequence TxID(k) is a pseudo-random sequence having a length of 141 bits. The transmitter identification sequence comprises in total 256 sequences, of which sequences 0-127 are used for region indication for indicating the area where the transmitter is located and are inserted into the even time slots (such as the time slots 0, 2, . . . ) of the signal frame for transmission and sequence 128-255 are used for transmitter identification for identifying different transmitters within the same region and are inserted into the odd time slots (such as the time slots 1, 3, . . . ) of the signal frame for transmission. The transmitter identification sequence is defined by a hexadecimal sequence which is mapped to a binary transmitter identification sequence in a Most Significant Bit (MSB)-first order.

According to the above solution, in order to enable the mobile multimedia broadcast transmission system to function properly in various frequency bandwidths, especially to provide high-quality mobile multimedia services for users in a 6 MHz operation bandwidth, the transmitter identification signal and the sync signal are appropriately configured based on technical characteristics of the system, such that stable system information can be provided for the system.

Figure 7:
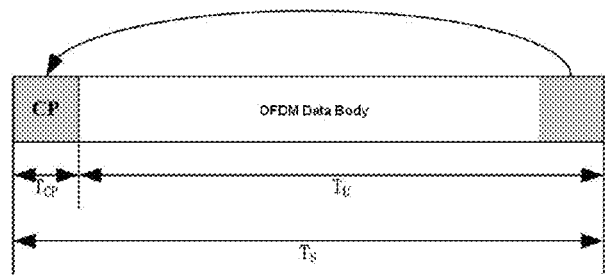
FIG. 7 is a schematic diagram showing the structure of an OFDM symbol.

FIG. 7 is a schematic diagram showing the structure of an OFDM symbol. The OFDM symbol is composed of a Cyclic Prefix (CP) and an OFDM symbol body. The CP has a duration $T_{CP}$ of 51.2 us, i.e., 512 sample points after IFFT. The OFDM symbol has a duration TS of 409.6 us, i.e., 4096 sample points after IFFT.

Figure 8:
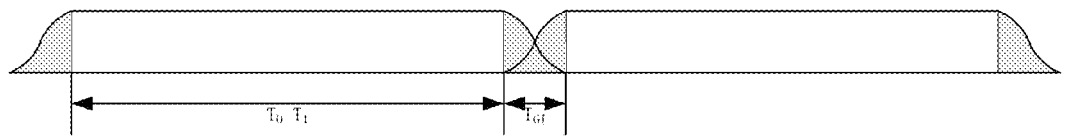
FIG. 8 is a schematic diagram showing the overlap between guard intervals.

The transmitter identification signal, the sync sequence and the adjacent OFDM symbols overlap with each other with a guard interval GD having a duration of 2.4 us, i.e., 24 sample points after IFFT. Between adjacent symbols, the GD at the end of the preceding symbol and the GD at the start of the subsequent symbol are superimposed after weighted with a window function, as shown in FIG. 8.

The window function has an expression of:

$$w(t) = \begin{cases} 0.5 + 0.5\cos(\pi + \pi t/T_{GD}), & 0 \le t \le T_{GD} \\ 1, & T_{GD} < t < T + T_{GD} \\ 0.5 + 0.5\cos(\pi + \pi(T-t)/T_{GD}), & T + T_{GD} \le t \le T + 2T_{GD}, \end{cases}$$

where t is a temporal variable, T is a constant and $T_{GD}$ is the duration of the guard interval.

Figure 9:
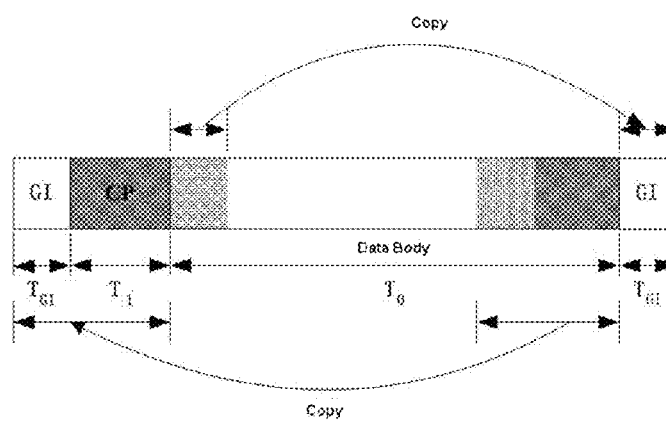
FIG. 9 is a schematic diagram showing the structure of an OFDM symbol.

The selection of the guard interval signal is shown in FIG. 9. For the transmitter identification signal, the sync signal and the OFDM symbol, the values of T0 and T1 portions are shown in Table 1, where T=T0+T1

TABLE 1

Values of Guard Interval Signal

| Signal | T0 (us) | T1 (us) |
|---|---|---|
| Transmitter Identification Signal | 25.6 | 10.4 |
| Sync Signal | 409.6 | 0 |
| OFDM Symbol | 409.6 | 51.2 |

Figures 10, 11:
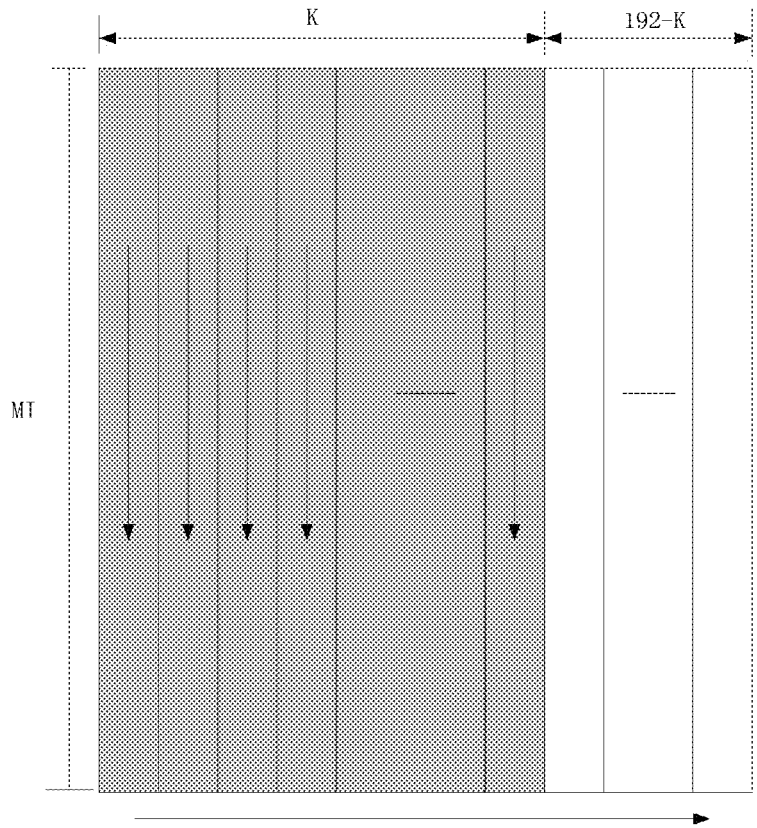
FIG. 10 is a schematic diagram for the byte interleaving unit and the RS (192, K) coding.
FIG. 11 is a schematic diagram showing the bit interleaving of a LDPC coded bit stream.

FIG. 10 is a schematic diagram for the byte interleaving unit and the RS (192, K) coding.

The byte interleaving unit is a block interleaver has MI rows and 192 columns. The number of rows MI for the byte interleaving unit depends on the byte interleaving mode and the LDPC code rate, as shown in Table 2:

TABLE 2

Values of Parameter MI for Byte Interleaving Unit

| | Interleaving Mode 1 | Interleaving Mode 2 | Interleaving Mode 3 |
|---|---|---|---|
| 1/2 LDPC Code | MI = 66 | MI = 132 | MI = 264 |
| 3/4 LDPC Code | MI = 99 | MI = 198 | MI = 396 |

The RS coding is based on a truncated code of RS(192, K) having a code length of 192 bytes as obtained by truncating an original system code of RS(255, M), where M=K+63, K is the number of bytes of information sequence in one codeword. That is, there are (192-K) check bytes. The RS(192, K) code provides four modes having the K value of 192, 168, 160 and 144, respectively.

Each code element of the RS code is taken from GF(256) field having a generation polynomial of $p(x)=x^8+x^4+x^3+x^2+1$.

The truncated code of RS(192, K) is coded in the following manner. First, 63 all-zero bytes are added in front of K input information bytes $(m_0, m_1, \ldots, m_{K-1})$ to construct an input sequence $(0, 0, \ldots, 0, m_0, m_1, \ldots, m_{K-1})$ for the original system code of RS(255, M). Then, the input sequence is coded to generate a codeword of $(0, 0, \ldots, 0, m_0, m_1, \ldots, m_{K-1}, p_0, p_1, \ldots, p_{255-M-1})$, from which the added bytes are removed to obtain a 192-byte codeword of the truncated RS code, $(m_0, m_1, \ldots, m_{K-1}, p_0, p_1, \ldots, p_{255-M-1})$.

The generation polynomial for the RS(192, K) code can be expressed as:

$$g(x) = \sum_{i=0}^{192-K} g_i x^i.$$

The polynomial for the input information sequence is:

$$m(x) = \sum_{i=0}^{K-1} m_i x^i.$$

In this case, the polynomial for the output system code is:

$$C(x) = \sum_{i=0}^{191} c_i x^i = x^{192-K} m(x) + r(x);$$

where $$r(x) = \frac{x^{192-K} m(x)}{g(x)}.$$

For K=192, the coefficient $g_i$ in the expression of the generation polynomial for RS(192, 192) is

| i | $g_i$ |
|---|---|
| 0 | 1 |

For K=168, the coefficient $g_i$ in the expression of the generation polynomial for RS(192, 168) is

| i | $g_i$ |
|---|---|
| 0 | 193 |
| 1 | 108 |
| 2 | 199 |
| 3 | 208 |
| 4 | 173 |
| 5 | 79 |
| 6 | 45 |
| 7 | 133 |
| 8 | 251 |
| 9 | 125 |
| 10 | 44 |
| 11 | 167 |
| 12 | 198 |
| 13 | 150 |
| 14 | 174 |
| 15 | 252 |
| 16 | 218 |
| 17 | 8 |
| 18 | 197 |
| 19 | 195 |
| 20 | 20 |
| 21 | 33 |
| 22 | 197 |
| 23 | 244 |
| 24 | 1 |

For k=160, the coefficient $g_i$ in the expression of the generation polynomial for RS(192, 160) is

| i | $g_i$ |
|---|---|
| 0 | 45 |
| 1 | 216 |
| 2 | 239 |
| 3 | 24 |
| 4 | 253 |
| 5 | 104 |
| 6 | 27 |
| 7 | 40 |
| 8 | 107 |
| 9 | 50 |
| 10 | 163 |
| 11 | 210 |
| 12 | 227 |
| 13 | 134 |
| 14 | 224 |
| 15 | 158 |
| 16 | 119 |
| 17 | 13 |
| 18 | 158 |
| 19 | 1 |
| 20 | 238 |
| 21 | 164 |
| 22 | 82 |
| 23 | 43 |
| 24 | 15 |
| 25 | 232 |
| 26 | 246 |
| 27 | 142 |
| 28 | 50 |
| 29 | 189 |
| 30 | 29 |
| 31 | 232 |
| 32 | 1 |

For k=144, the coefficient $g_i$ in the expression of the generation polynomial for RS(192, 144) is

| i | $g_i$ |
|---|---|
| 0 | 228 |
| 1 | 231 |
| 2 | 214 |
| 3 | 81 |
| 4 | 113 |
| 5 | 204 |
| 6 | 19 |
| 7 | 169 |
| 8 | 10 |
| 9 | 244 |
| 10 | 117 |
| 11 | 219 |
| 12 | 130 |
| 13 | 12 |
| 14 | 160 |
| 15 | 151 |
| 16 | 195 |
| 17 | 170 |
| 18 | 150 |
| 19 | 151 |
| 20 | 251 |
| 21 | 218 |
| 22 | 245 |
| 23 | 166 |
| 24 | 149 |
| 25 | 183 |
| 26 | 109 |
| 27 | 176 |
| 28 | 148 |
| 29 | 218 |
| 30 | 21 |
| 31 | 161 |
| 32 | 240 |
| 33 | 25 |
| 34 | 15 |
| 35 | 71 |
| 36 | 62 |
| 37 | 5 |
| 38 | 17 |
| 39 | 32 |
| 40 | 157 |
| 41 | 194 |
| 42 | 73 |
| 43 | 195 |
| 44 | 218 |
| 45 | 14 |
| 46 | 12 |
| 47 | 122 |
| 48 | 1 |

The approach for coding and byte interleaving is as follows. The transmission data block is input to the block interleaver in a column-wise manner from left to right in units of bytes, up to K columns each having MI bytes. The RS coding is carried out in a row-wise manner. The remaining 192-K columns are filled with check bytes. The coded data is output from left to right according to the input order until all of the 192 columns are completed.

The above RS coding and byte interleaving is carried out on a basis of physical logical channel. The upper layer data packets on the same physical logical channel are sequentially input to the byte interleaving unit for byte interleaving and RS coding. The first byte in column 0 of the byte interleaving unit is defined as the start byte of the byte interleaving unit. Each block of MI×192 bytes output from the byte interleaving unit is always mapped onto an integer number of time slots for transmission and the start byte of the byte interleaving unit is mapped onto the start point of a particular time slot for transmission.

With the above solution, an optimized selection is performed on RS coding according to the operation bandwidth of the system, thereby selecting an appropriate coding mode according to different channel conditions. Accordingly, the byte interleaving unit is optimized, such that suitable interleaving parameters can be used to perform byte interleaving.

Each byte of the above RS coded and byte interleaved transmission data is mapped to a 8-bit bit stream according to a most significant bit-first transmission principal and input to the LDPC coder. The first byte in column 0 of the byte interleaving unit is defined as the start byte of the byte interleaving unit, whose most significant bit is always mapped onto the first bit of the LDPC input bit block. The LDPC coding configuration is shown in Table 3.

TABLE 3

LDPC Coding Configuration

| Code Rate | Input Block Length | Output Block Length |
|---|---|---|
| 1/2 | 4608 bits | 9216 bits |
| 3/4 | 6912 bits | 9216 bits |

The LDPC coding can be given by a check matrix H, which is generated according to one of the following approaches.

1) 1/2 LDPC code check matrix generation approach

| 0 | 6 | 12 | 18 | 25 | 30 |
|---|---|---|---|---|---|
| 0 | 7 | 19 | 26 | 31 | 5664 |
| 0 | 8 | 13 | 20 | 32 | 8270 |
| 1 | 6 | 14 | 21 | 3085 | 8959 |
| 1 | 15 | 27 | 33 | 9128 | 9188 |
| 1 | 9 | 16 | 34 | 8485 | 9093 |
| 2 | 6 | 28 | 35 | 4156 | 7760 |
| 2 | 10 | 17 | 7335 | 7545 | 9138 |
| 2 | 11 | 22 | 5278 | 8728 | 8962 |
| 3 | 7 | 2510 | 4765 | 8637 | 8875 |
| 3 | 4653 | 4744 | 7541 | 9175 | 9198 |
| 3 | 23 | 2349 | 9012 | 9107 | 9168 |
| 4 | 7 | 29 | 5921 | 7774 | 8946 |
| 4 | 7224 | 8074 | 8339 | 8725 | 9212 |
| 4 | 4169 | 8650 | 8780 | 9023 | 9159 |
| 5 | 8 | 6638 | 8986 | 9064 | 9210 |
| 5 | 2107 | 7787 | 8655 | 9141 | 9171 |
| 5 | 24 | 5939 | 8507 | 8906 | 9173 |

The cyclic program segment for generating 1/2 LDPC code check matrix is given below.

```
for I=1:18;
    Extract the I-th row from the above table and denote it as hexp;
    for J=1:256;
        ROW = (J−1) *18+I;
        for K=1:6;
            COLUMN=[(⌊hexp(K)/36⌋+J−1)%256]*36+
            (hexp(K)%36)+1 ;
            The element at row ROW and column
            COLUMN of the parity check matrix is non-zero;
        end;
    end;
end;
```

2) 3/4 LDPC code check matrix generation approach

| 0 | 3 | 6 | 12 | 16 | 18 | 21 | 24 | 27 | 31 | 34 | 7494 |
|---|---|---|---|---|---|---|---|---|---|---|---|
| 0 | 4 | 10 | 13 | 25 | 28 | 5233 | 6498 | 7018 | 8358 | 8805 | 9211 |
| 0 | 7 | 11 | 19 | 22 | 6729 | 6831 | 7913 | 8944 | 9013 | 9133 | 9184 |
| 1 | 3 | 8 | 14 | 17 | 20 | 29 | 32 | 5000 | 5985 | 7189 | 7906 |
| 1 | 9 | 4612 | 5523 | 6456 | 7879 | 8487 | 8952 | 9081 | 9129 | 9164 | 9214 |
| 1 | 5 | 23 | 26 | 33 | 35 | 7135 | 8525 | 8983 | 9015 | 9048 | 9154 |
| 2 | 3 | 30 | 3652 | 4067 | 5123 | 7808 | 7838 | 8231 | 8474 | 8791 | 9162 |
| 2 | 35 | 3774 | 4310 | 6827 | 6917 | 8264 | 8416 | 8542 | 8834 | 9044 | 9089 |
| 2 | 15 | 631 | 1077 | 6256 | 7859 | 8069 | 8160 | 8657 | 8958 | 9094 | 9116 |

The cyclic program segment for generating 3/4 LDPC code check matrix is given below.

```
for I=1:9;
    Extract the I-th row from the above table and denote it as hexp;
    for J=1:256;
        ROW = (J−1) *9+I;
        for K=1:12;
            COLUMN=[(⌊hexp(K)/36⌋+J−1)%256]*36+
            (hexp(K)%36)+1 ;
            The element at row ROW and column COLUMN
                of the parity check matrix is non-zero;
        end;
    end;
end
```

FIG. 11 is a schematic diagram showing the bit interleaving of a LDPC coded bit stream.

The bit interleaver is configured as a 384×264 block interleaver. The LDPC coded binary sequence is sequentially written into each row of the block interleaver in a top-down order until the entire interleaver is fully filled and then sequentially read out in a column-wise manner from left to right. The output from the bit interleaver is aligned with the time slots. That is, the first bit transmitted in each slot is always defined as the first bit output from the bit interleaver.

Figure 12:
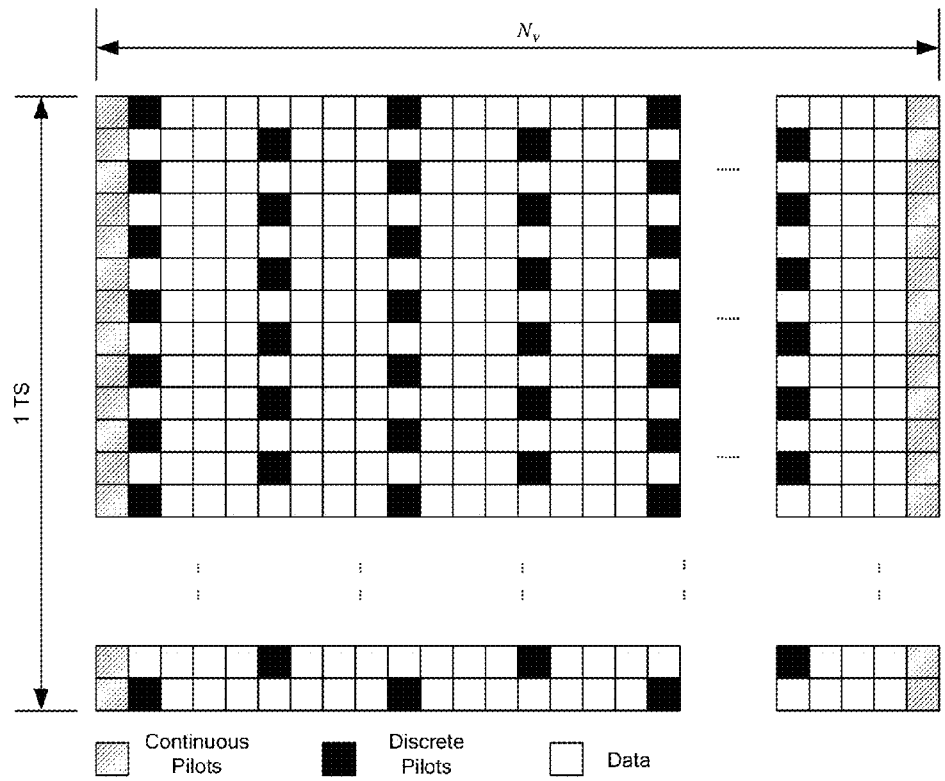
FIG. 12 is a schematic diagram illustrating a pilot multiplexing approach for allocating sub-carriers of an OFDM symbol to data symbols, discrete pilots and continuous pilots.

FIG. 12 is a schematic diagram illustrating a pilot multiplexing approach for allocating sub-carriers of an OFDM symbol to data symbols, discrete pilots and continuous pilots. In the figure, the hatched portions represent continuous pilot signals, the black portions represent discrete pilot signals and the white portions represent data symbols resulted from constellation mapping. As shown, the pilot multiplexing approach multiplexes data symbols, discrete pilots and continuous pilots together for form an OFDM frequency domain symbol. Each OFDM symbol contains 2276 sub-carriers (0-2275), denoted as X(i), i=0, 1, . . . 2275, including 284 discrete pilots, 78 continuous pilots and 1914 data sub-carriers.

In FIG. 12, the continuous pilots use in total 78 sub-carriers each numbered 0, 2, 40, 92, 124, 138, 178, 200, 206, 234, 280, 292, 342, 384, 390, 410, 472, 496, 502, 526, 564, 616, 638, 662, 706, 742, 762, 768, 814, 842, 866, 884, 942, 974, 1004, 1020, 1052, 1134, 1137, 1138, 1140, 1222, 1254, 1270, 1300, 1368, 1390, 1408, 1432, 1460, 1506, 1512, 1532, 1568, 1612, 1636, 1658, 1710, 1748, 1772, 1778, 1802, 1864, 1884, 1890, 1932, 1982, 1994, 2040, 2068, 2074, 2096, 2136, 2150, 2182, 2234, 2272, 2275, of which in total 64 sub-carriers each numbered 2, 496, 1368, 1802, 40, 502, 1390, 1864, 92, 526, 1408, 1884, 124, 564, 1432, 1890, 138, 616, 1460, 1932, 178, 638, 1506, 1982, 200, 662, 1512, 1994, 206, 706, 1532, 2040, 234, 742, 1568, 2068, 280, 762, 1612, 2074, 292, 768, 1636, 2096, 342, 814, 1658, 2136, 384, 842, 1710, 2150, 390, 866, 1748, 2182, 410, 884, 1772, 2234, 472, 942, 1778, 2272 are used for carrying 16-bit system information. The system information bits are mapped, with four-fold repetition coding, onto four continuous pilots for transmission. The mapping is shown in Table 4 and the system information is detailed in Table 5. The remaining continuous pilots each transmit "0".

TABLE 4

Repetition Coding on Continuous Pilots

| Bit | Sub-Carrier Number Used |
| --- | --- |
| 0 | 2, 496, 1368, 1802 |
| 1 | 40, 502, 1390, 1864 |
| 2 | 92, 526, 1408, 1884 |
| 3 | 124, 564, 1432, 1890 |
| 4 | 138, 616, 1460, 1932 |
| 5 | 178, 638, 1506, 1982 |
| 6 | 200, 662, 1512, 1994 |
| 7 | 206, 706, 1532, 2040 |
| 8 | 234, 742, 1568, 2068 |
| 9 | 280, 762, 1612, 2074 |
| 10 | 292, 768, 1636, 2096 |
| 11 | 342, 814, 1658, 2136 |
| 12 | 384, 842, 1710, 2150 |
| 13 | 390, 866, 1748, 2182 |
| 14 | 410, 884, 1772, 2234 |
| 15 | 472, 942, 1778, 2272 |

TABLE 5

System Information Transmitted in Continuous Pilots

| Bit | Information |
| --- | --- |
| 0~5 | Time Slot Number |
| 6 | Byte Interleaving Unit Sync Identification |
| 7 | Control Logical Channel Alternation Indication |
| 8~15 | Reserved |

The information content contained in the respective bits in Table 5 is detailed as follows:

1) bit0~bit5 represent the current time slot number and range from 0 to 39;
2) bit6 represents a byte interleaving unit sync identification which is set to 1 to identify the current time slot as the start time slot of the byte interleaving unit;
3) bit7 represents a control logical channel alternation indication which indicates the alternation of terminal control logical channel configuration information in a differentially modulated manner. The differential approach is such that, if the bit7 in the preceding frame carries a, 0 or 1, and the system control logical channel configuration information will be alternated in the subsequent frame, then $\bar{a}$ will be transmitted in the current frame and remains unchanged until next alternation.
4) bit8~bit14 are reserved.

The continuous pilots are mapped onto the sub-carriers according to:

$$0 \rightarrow \sqrt{2}/2 + \sqrt{2}/2j \text{ and } 1 \rightarrow -\sqrt{2}/2 - \sqrt{2}/2j.$$

In a single time slot, the symbols transmitted at same continuous sub-carrier point of different OFDM symbols are identical to each other.

For an OFDM symbol numbered n in each time slot ($0 \leq n \leq 52$), the sub-carriers corresponding to the discrete pilots in the OFDM symbol are numbered as m, where $$\text{if } \mod(n, 2) = 0$$
$$m = \begin{cases} 8p + 1, & p = 0, 1, 2, \ldots, 141 \\ 8p + 3, & p = 142, 143, 144, \ldots, 283 \end{cases}$$
$$\text{if } \mod(n, 2) = 1$$
$$m = \begin{cases} 8p + 5, & p = 0, 1, 2, \ldots, 141 \\ 8p + 7, & p = 142, 143, 144, \ldots, 283 \end{cases},$$

and the values of the discrete pilots are all 1+0j.

In FIG. 12, the data symbols are mapped according to an order of sub-carriers and OFDM symbols. Among the effective sub-carriers in each OFDM symbol, the sub-carriers other than the discrete pilots and the continuous pilots are data sub-carriers. There are in total 101,442 data sub-carriers in each time slot, of which the first 101,376 data sub-carriers are used for carrying constellation mapped data symbols and the last 66 sub-carriers are filled with 0+0j.

According to the above solution of the present invention, the continuous pilots, the discrete pilots and the digital sub-carriers of the system can be suitably configured and allocated according to the actual bandwidth of the system, thereby suitably configuring the system overhead of the mobile multimedia broadcast transmission system to efficiently utilize spectral resources for data transmission.

All of the symbols (effective sub-carriers) in the time-frequency grid shown in FIG. 12, including data sub-carriers, discrete pilots and continuous pilots, are scrambled with a complex pseudo-random sequence $P_c(i)$ which is generated according to:

$$P_c(i) = \frac{\sqrt{2}}{2}[(1 - 2S_i(i)) + j(1 - 2S_q(i))]$$

where $S_i(i)$ and $S_q(i)$ are each Pseudo-Random Binary Sequence (PRBS).

Figure 13:
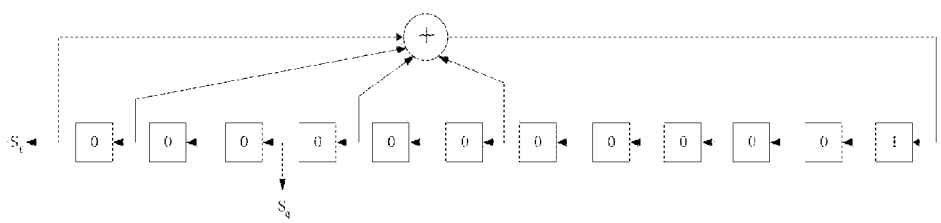
FIG. 13 is a schematic diagram illustrating a process for generating PRBS.

FIG. 13 is a schematic diagram illustrating a process for generating PRBS.

As shown, the generation polynomial for the PRBS is $x^{12}+x^{11}+x^8+x^6+1$, which corresponds to the structure of the shift register in the figure. The initial value of the shift register can be dependent on scramble code patterns with the following correspondence:

1) Scramble Code Pattern 0—Initial value 0000 0000 0001,
2) Scramble Code Pattern 1—Initial value 0000 1001 0011,
3) Scramble Code Pattern 2—Initial value 0000 0100 1100,
4) Scramble Code Pattern 3—Initial value 0010 1011 0011,
5) Scramble Code Pattern 4—Initial value 0111 0100 0100,
6) Scramble Code Pattern 5—Initial value 0100 0100 1100,
7) Scramble Code Pattern 6—Initial value 0001 0110 1101,
8) Scramble Code Pattern 7—Initial value 1010 1011 0011.

The PRBS is reset at the start of each time slot such that all of the time slots are scrambled with the same pattern.

The scrambling is achieved by complexly multiplying the complex symbols in the effective sub-carriers with the complex pseudo-random sequence $P_c(i)$ according to:

$$Y_n(i)=X_n(i)\times P_c(n\times 2276+i), 0\leq i\leq 2275, 0\leq n\leq 52,$$

where $X_n(i)$ denotes the i-th effective sub-carrier on the n-th OFDM symbol in each time slot prior to scrambling, and $Y_n(i)$ denotes the scrambled effective sub-carrier.

Figure 14:
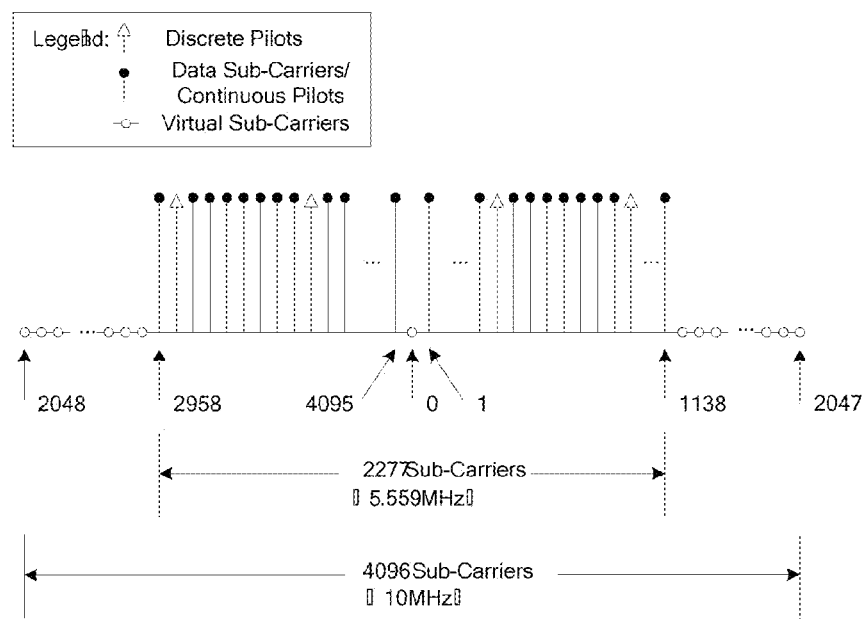
FIG. 14 is a schematic diagram showing the structure of sub-carriers of an OFDM symbol.

FIG. 14 is a schematic diagram showing the structure of sub-carriers of an OFDM symbol.

After pilot insertion and scrambling, the above OFDM effective sub-carriers $Y_n(i)$, $0\leq i\leq N_S-1$ can be mapped to an OFDM symbol by means of IFFT according to:

$$S_n(t) = \frac{1}{\sqrt{N_S}} \sum_{i=0}^{N_S-1} Z_n(i) e^{j2\pi i (\Delta f)_S (t-T_{CP})}, 0\leq t\leq T_S, 0\leq n\leq 52$$

where $S_n(t)$ is the n-th OFDM symbol in the time slot, $N_S$ is the number of sub-carriers of the OFDM symbol, $Z_n(i)$ is the IFFT input signal of the n-th OFDM symbol, $(\Delta f)_S$ is the sub-carrier interval of the OFDM symbol and has the value of 2.44140625 kHz, $T_{CP}$ is the duration of the cyclic prefix of the OFDM symbol and has the value of 51.2 μs, $T_S$ is the duration of the OFDM symbol and has the value of 460.8 μs.

The number of sub-carriers of the OFDM symbol $N_S$=4096, and the IFFT input signal $Z_n(i)$ has the following relationship with the OFDM frequency domain effective sub-carriers $Y_n(i)$:

$$Z_n(i) = \begin{cases} Y_n(i-1), & 1\leq i\leq 1138 \\ Y_n(i-1820), & 2958\leq i\leq 4095 \\ 0, & i=0 或 1139\leq i\leq 2957 \end{cases}$$

The IFFT transformed OFDM symbol is shown in FIG. 7, to which a Cyclic Prefix (CP) is added to form a time domain OFDM symbol.

According to the frame structure shown in FIG. 4, the guard interval, the sync signal and the transmitter identification signal are sequentially added to the modulated OFDM symbol to form a time slot. Then, 40 time slots are concatenated to form a physical layer signal frame.

The upper layer data stream of the system can be a video stream including H.264, AVS, MPEG-2, MPEG-4 and the like, or an audio stream including AC-3, AAC and the like, as well as various data formats for other types of data. The data to be coded may be various broadcast data including single media (e.g., video source coding, text) and multimedia (a combination of audio, video, text and data).

It can be appreciated by those skilled in the art that all or a part of the steps according to the above embodiments can be implemented in hardware based on program instructions. The program can be stored in a computer readable storage medium and, when executed, performs one of the steps of the method embodiments or combination thereof.

In addition, the respective functional units in various embodiments of the present invention can be integrated into one processing module or implemented as stand-alone units. Also, two or more units can be integrated into one module. The integrated module can be implemented in hardware or software functional modules. When implemented in software functional modules and sold or used as stand-alone products, the integrated modules can be stored in a computer readable storage medium.

The above mentioned storage medium can be a read only memory, a disk or an optical disc.

While the foregoing describes the preferred embodiments of the present invention, it should be noted that various improvements and modifications can be made by those skilled in the art without departing from the principle of the present invention. These improvements and modifications are encompassed by the scope of the present invention.

What is claimed is:

1. A mobile multimedia broadcast transmission system, comprising:
 a Reed-Solomon (RS) coding and byte interleaving unit for RS coding and byte interleaving an upper layer data stream through a physical logical channel;
 a Low Density Parity Check (LDPC) coder for LDPC coding the data output from the RS coding and byte interleaving unit to obtain bit data;
 a bit interleaver for bit interleaving the bit data output from the LDPC coder;
 a constellation mapper for constellation mapping the data output from the bit interleaver;
 a frequency domain symbol generator for multiplexing discrete pilots, continuous pilots containing system information and constellation mapped data symbols into OFDM frequency domain symbols;
 a scrambler adapted for scrambling the OFDM frequency domain symbols with a pseudo-random sequence;
 an Inverse Fast Fourier Transformer (IFFT) for IFFT transforming the frequency domain symbols output from the scrambler to generate OFDM time domain symbols;
 a time domain framer for forming the OFDM time domain symbols into time slots and concatenating the time slots into a physical layer signal frame; and
 a transmitter for converting the physical layer signal frame from baseband to radio frequency for transmission, wherein the transmitter is configured for signal transmission over any 6 MHz bandwidth in a wireless channel, and wherein the physical layer signal frame has a duration of one second and includes 40 time slots each having a duration of 25 ms, each time slot including one beacon and 53 OFDM symbols, the beacon including one transmitter identification signal and two identical sync signals, the transmitter identification signal is identified by 141-bit information, carried by a number $N_{ID}$=256 of sub-carriers and modulated with BPSK, the transmitter identification signal TxID(k) being generated by mapping a transmitter identification sequence according to:

$$X_{ID}(i) = \begin{cases} 1 - 2 \times TxID(i-1), & 1 \le i \le 70 \\ 0, & i = 0 \text{ or } 71 \le i \le 184 \\ 1 - 2 \times TxID(i-115), & 185 \le i \le 255. \end{cases}$$

2. The mobile multimedia broadcast transmission system according to claim 1, wherein, the transmitter identification signal being obtained by BPSK mapping, IFFT transforming and periodically spreading a frequency domain random sequence, each of the sync signals being obtained by BPSK mapping and IFFT transforming a truncated frequency domain random sequence.

3. The mobile multimedia broadcast transmission system according to claim 2, wherein the sync signal $S_b(t)$ is a band-limited pseudo-random signal having a duration $T_b$ of 204.8 μs:

$$S_b(t) = \frac{1}{\sqrt{N_b}} \sum_{i=0}^{N_b-1} X_b(i) e^{j2\pi i (\Delta f)_b t}, \ 0 \le t \le T_b,$$

where $N_b$ is the number of sub-carriers for carrying the sync signal, $X_b(i)$ is a BPSK modulated signal carrying a binary pseudo-random sequence $X_b(i)$, and $(\Delta f)_b$ is the sub-carrier interval for the sync signal;
wherein $N_b$=2048, and the BPSK modulated signal $X_b(i)$ for $PN_b(k)$ is generated by mapping $PN_b(k)$ according to:

$$X_b(i) = \begin{cases} 1 - 2 \times PN_b(i-1), & 1 \le i \le 568 \\ 0, & i = 0 \text{ or } 569 \le i \le 1479 \\ 1 - 2 \times PN_b(i-912), & 1480 \le i \le 2047. \end{cases}$$

4. The mobile multimedia broadcast transmission system according to claim 3, wherein the binary pseudo-random sequence is generated by a linear feedback shift register having an initial value of 01110101101 and a generation polynomial of $x^{11}+x^9+1$.

5. The mobile multimedia broadcast transmission system according to claim 2, wherein the transmitter identification, the sync sequence and the OFDM symbols overlap with each other with a guard interval having a window function, the window function having an expression of:

$$w(t) = \begin{cases} 0.5 + 0.5\cos(\pi + \pi t / T_{GD}), & 0 \le t \le T_{GD} \\ 1, & T_{GD} < t < T + T_{GD} \\ 0.5 + 0.5\cos(\pi + \pi (T-t)/T_{GD}), & T + T_{GD} \le t \le T + 2T_{GD}, \end{cases}$$

where t is a temporal variable, T is a constant and $T_{GD}$ is the duration of the guard interval.

6. The mobile multimedia broadcast transmission system according to claim 1, wherein the RS coding is based on a truncated code of RS(192, K) obtained by truncating an original system code of RS(255, M), where M=K+63, K is the number of bytes of information sequence in one codeword, each code element of the system code of RS(255, M) being taken from GF(256) field having a generation polynomial of $p(x)=x^8+x^4+x^3+x^2+1$.

7. The mobile multimedia broadcast transmission system according to claim 6, wherein the RS(192, K) code comprises four modes having the K value of 192, 168, 160 and 144, respectively.

8. The mobile multimedia broadcast transmission system according to claim 7, wherein the expression of the generation polynomial for the RS(192, K) code is $$g(x) = \sum_{i=0}^{192-K} g_i x^i,$$

and wherein for K=192, the coefficient $g_i$ in the expression of the generation polynomial for RS(192, 192) is

| i | $g_i$ |
|---|---|
| 0 | 1 | for K=168, the coefficient $g_i$ in the expression of the generation polynomial for RS(192, 168) is

| i | $g_i$ |
|---|---|
| 0 | 193 |
| 1 | 108 |
| 2 | 199 |
| 3 | 208 |
| 4 | 173 |
| 5 | 79 |
| 6 | 45 |
| 7 | 133 |
| 8 | 251 |
| 9 | 125 |
| 10 | 44 |
| 11 | 167 |
| 12 | 198 |
| 13 | 150 |
| 14 | 174 |
| 15 | 252 |
| 16 | 218 |
| 17 | 8 |
| 18 | 197 |
| 19 | 195 |
| 20 | 20 |
| 21 | 33 |
| 22 | 197 |
| 23 | 244 |
| 24 | 1 | for k=160, the coefficient in the expression of the generation polynomial for RS(192, 160) is

| i | $g_i$ |
|---|---|
| 0 | 45 |
| 1 | 216 |
| 2 | 239 |
| 3 | 24 |
| 4 | 253 |
| 5 | 104 |
| 6 | 27 |
| 7 | 40 |

-continued

| i | $g_i$ |
|---|---|
| 8 | 107 |
| 9 | 50 |
| 10 | 163 |
| 11 | 210 |
| 12 | 227 |
| 13 | 134 |
| 14 | 224 |
| 15 | 158 |
| 16 | 119 |
| 17 | 13 |
| 18 | 158 |
| 19 | 1 |
| 20 | 238 |
| 21 | 164 |
| 22 | 82 |
| 23 | 43 |
| 24 | 15 |
| 25 | 232 |
| 26 | 246 |
| 27 | 142 |
| 28 | 50 |
| 29 | 189 |
| 30 | 29 |
| 31 | 232 |
| 32 | 1 | for k=144, the coefficient in the expression of the generation polynomial for RS(192, 144) is

| i | $g_i$ |
|---|---|
| 0 | 228 |
| 1 | 231 |
| 2 | 214 |
| 3 | 81 |
| 4 | 113 |
| 5 | 204 |
| 6 | 19 |
| 7 | 169 |
| 8 | 10 |
| 9 | 244 |
| 10 | 117 |
| 11 | 219 |
| 12 | 130 |
| 13 | 12 |
| 14 | 160 |
| 15 | 151 |
| 16 | 195 |
| 17 | 170 |
| 18 | 150 |
| 19 | 151 |
| 20 | 251 |
| 21 | 218 |
| 22 | 245 |
| 23 | 166 |
| 24 | 149 |
| 25 | 183 |
| 26 | 109 |
| 27 | 176 |
| 28 | 148 |
| 29 | 218 |
| 30 | 21 |
| 31 | 161 |
| 32 | 240 |
| 33 | 25 |
| 34 | 15 |
| 35 | 71 |
| 36 | 62 |
| 37 | 5 |
| 38 | 17 |
| 39 | 32 |
| 40 | 157 |
| 41 | 194 |
| 42 | 73 |

-continued

| i | $g_i$ |
|---|---|
| 43 | 195 |
| 44 | 218 |
| 45 | 14 |
| 46 | 12 |
| 47 | 122 |
| 48 | 1. |

9. The mobile multimedia broadcast transmission system according to claim 8, wherein the upper layer data stream is input to the RS coding and byte interleaving unit in a column-wise manner from left to right in units of bytes, and wherein the RS coding is carried out in a row-wise manner and the start byte of the byte interleaving unit is mapped onto the start point of a particular time slot for transmission.

10. The mobile multimedia broadcast transmission system according to claim 9, wherein the block output from the LDPC coder has a length of 9216 bits and code rates of 1/2 and 3/4, respectively, and wherein the interleaving modes of the byte interleaving unit corresponding to the code rates are:

| | 1/2 LDPC Code | 3/4 LDPC Code |
|---|---|---|
| Interleaving Mode 1 | MI = 66 | MI = 99 |
| Interleaving Mode 2 | MI = 132 | MI = 198 |
| Interleaving Mode 3 | MI = 264 | MI = 396 | where MI is the number of rows for the byte interleaving unit which having MI×192 bytes in total.

11. The mobile multimedia broadcast transmission system according to claim 1, wherein the bit interleaver is configured as a 384×264 block interleaver, the bit data output from the LDPC coder is sequentially written into each row of the block interleaver in a top-down order until the entire block interleaver is fully filled and then sequentially read out in a column-wise manner from left to right, and wherein the output from the bit interleaver is aligned with the time slots.

12. The mobile multimedia broadcast transmission system according to claim 1, wherein the frequency domain symbol generator is configured to multiplex, in each OFDM symbol, 284 discrete pilots, 78 continuous pilots and 1914 data sub-carriers into 2276 effective sub-carriers.

13. The mobile multimedia broadcast transmission system according to claim 12, wherein the 78 continuous pilots use the sub-carriers numbered 0, 2, 40, 92, 124, 138, 178, 200, 206, 234, 280, 292, 342, 384, 390, 410, 472, 496, 502, 526, 564, 616, 638, 662, 706, 742, 762, 768, 814, 842, 866, 884, 942, 974, 1004, 1020, 1052, 1134, 1137, 1138, 1140, 1222, 1254, 1270, 1300, 1368, 1390, 1408, 1432, 1460, 1506, 1512, 1532, 1568, 1612, 1636, 1658, 1710, 1748, 1772, 1778, 1802, 1864, 1884, 1890, 1932, 1982, 1994, 2040, 2068, 2074, 2096, 2136, 2150, 2182, 2234, 2272, 2275 from the 2276 effective sub-carriers, of which 64 sub-carriers each numbered 2, 496, 1368, 1802, 40, 502, 1390, 1864, 92, 526, 1408, 1884, 124, 564, 1432, 1890, 138, 616, 1460, 1932, 178, 638, 1506, 1982, 200, 662, 1512, 1994, 206, 706, 1532, 2040, 234, 742, 1568, 2068, 280, 762, 1612, 2074, 292, 768, 1636, 2096, 342, 814, 1658, 2136, 384, 842, 1710, 2150, 390, 866, 1748, 2182, 410, 884, 1772, 2234, 472, 942, 1778, 2272 are used for carrying 16-bit system information; wherein the system information contains a 6-bit time slot number, a 1-bit byte interleaving unit sync identification, a 1-bit control logical channel alternation indication and a 8-bit reserved word; wherein the continuous pilots are mapped onto the sub-carriers according to:

$$0 \to \sqrt{2}/2 + \sqrt{2}/2 j \text{ and } 1 \to -\sqrt{2}/2 - \sqrt{2}/2 j$$

and wherein, in a single time slot, the symbols transmitted at same continuous sub-carrier point of different OFDM symbols are identical to each other.

14. The mobile multimedia broadcast transmission system according to claim 13, wherein, for an OFDM symbol numbered n in each time slot, the sub-carriers corresponding to the discrete pilots in the OFDM symbol are numbered as m, where if $\mod(n, 2) = 0$
$$m = \begin{cases} 8p+1, & p = 0, 1, 2, \ldots, 141 \\ 8p+3, & p = 142, 143, 144, \ldots, 283 \end{cases}$$

if $\mod(n, 2) = 1$
$$m = \begin{cases} 8p+5, & p = 0, 1, 2, \ldots, 141 \\ 8p+7, & p = 142, 143, 144, \ldots, 283 \end{cases},$$

and the values of the discrete pilots are all 1+0j.

15. The mobile multimedia broadcast transmission system according to claim 1, wherein the generation polynomial for the pseudo-random sequence used by the scrambler is, and the scramble code has eight patterns corresponding to the following initial values of the register, respectively:

1) Scramble Code Pattern 0—Initial value 0000 0000 0001,
2) Scramble Code Pattern 1—Initial value 0000 1001 0011,
3) Scramble Code Pattern 2—Initial value 0000 0100 1100,
4) Scramble Code Pattern 3—Initial value 0010 1011 0011,
5) Scramble Code Pattern 4—Initial value 0111 0100 0100,
6) Scramble Code Pattern 5—Initial value 0100 0100 1100,
7) Scramble Code Pattern 6—Initial value 0001 0110 1101,
8) Scramble Code Pattern 7—Initial value 1010 1011 0011;

and wherein the pseudo-random sequence is reset at the start of each time slot such that all of the time slots are scrambled with the same pattern.

16. The mobile multimedia broadcast transmission system according to claim 1, wherein the IFFT unit is configured to place the 2276 effective sub-carriers in sub-carriers 1-1138 and 2958-4095 of 4096 sub-carriers for a 4096-point IFFT operation.

17. The mobile multimedia broadcast transmission system according to any one of claims 1 to 16, wherein the time domain framing unit is configured to add a guard interval, a sync signal and a transmitter identification signal sequentially to a modulated OFDM symbol to form a time slot and to concatenate 40 time slots into a physical layer signal frame.

* * * * *